United States Patent
Kelly

(10) Patent No.: US 9,977,437 B1
(45) Date of Patent: May 22, 2018

(54) PILOT OPERATED PARALLEL VALVE

(71) Applicant: Edmund F. Kelly, Costa Mesa, CA (US)

(72) Inventor: Edmund F. Kelly, Costa Mesa, CA (US)

( * ) Notice: Subject to any disclaimer, the term of this patent is extended or adjusted under 35 U.S.C. 154(b) by 445 days.

(21) Appl. No.: 14/638,884

(22) Filed: Mar. 4, 2015

(51) Int. Cl.
*G05D 11/13* (2006.01)

(52) U.S. Cl.
CPC .................. *G05D 11/132* (2013.01)

(58) Field of Classification Search
USPC ................. 251/30.01, 30.02, 30.05
See application file for complete search history.

(56) References Cited

U.S. PATENT DOCUMENTS

| | | | | |
|---|---|---|---|---|
| 3,112,094 A * | 11/1963 | Nees | ...................... | F16K 31/145 236/80 R |
| 2011/0266473 A1* | 11/2011 | Santinanavat | .......... | F23N 1/002 251/30.01 |
| 2012/0055566 A1* | 3/2012 | Mesner | ................. | F16K 31/406 137/485 |

* cited by examiner

*Primary Examiner* — Jessica Cahill
*Assistant Examiner* — Daphne M Barry
(74) *Attorney, Agent, or Firm* — Jeffer Mangels Butler & Mitchell LLP; Brennan C. Swain, Esq.

(57) ABSTRACT

An electropneumatic proportional flow control device improves flow control because it incorporates two internal valves in parallel: a first electronically controlled, miniature proportional valve manipulated in parallel with a second and larger pilot-operated valve. The miniature valve allows for precision control of the low-end of the full scale output; the larger mechanical valve allows for the high-end of the full scale output. These valves are encompassed within a valve assembly comprising a valve manifold, a pilot-operated diaphragm, electronic control circuitry, and a flow restrictor.

20 Claims, 1 Drawing Sheet

U.S. Patent     May 22, 2018     US 9,977,437 B1
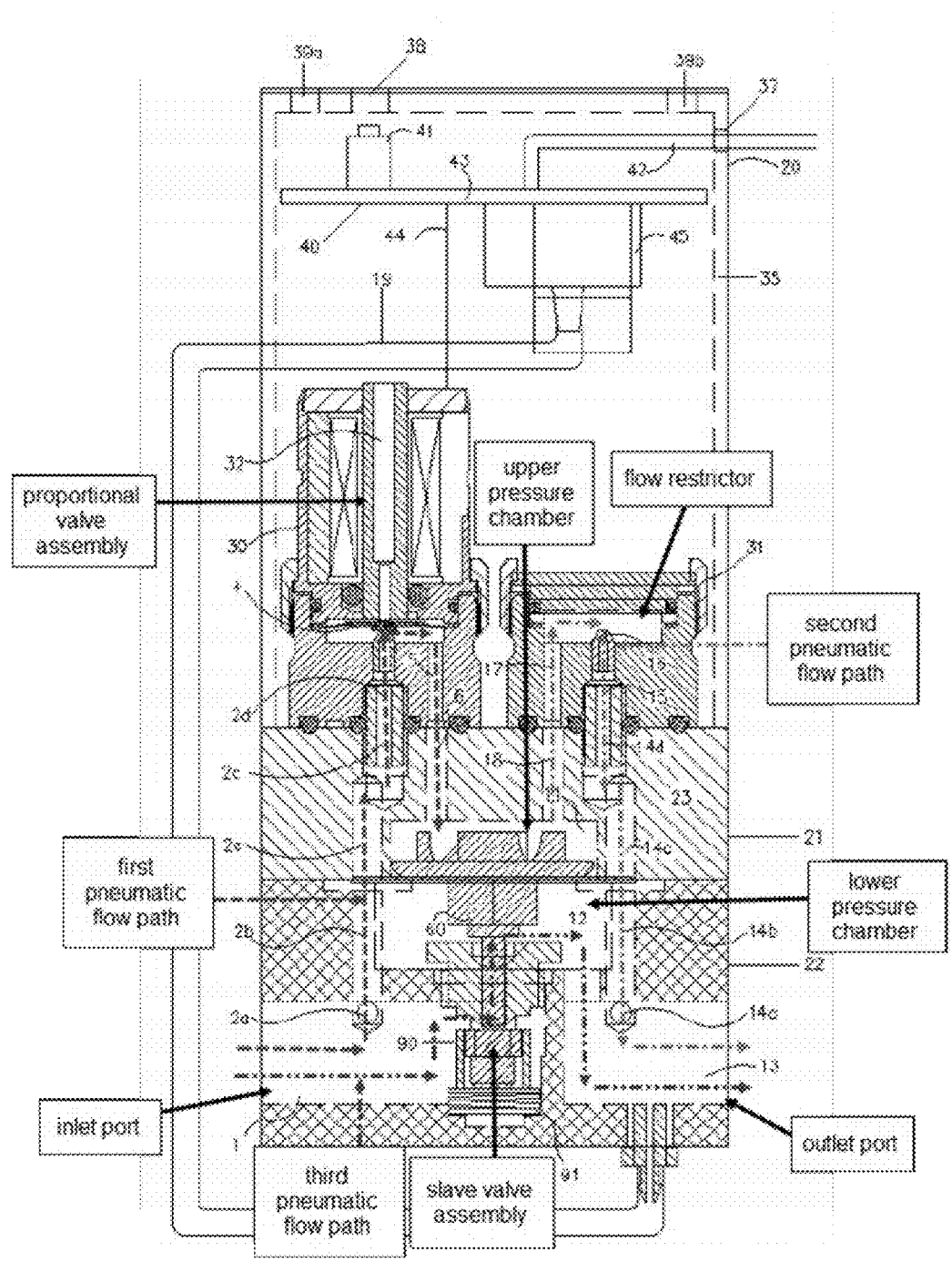

PILOT OPERATED PARALLEL VALVE

FIELD OF THE INVENTION

The present invention relates generally to a device for electropneumatic control of pneumatically operated valves and, more specifically to a valve having two bodies that operate in parallel: a small valve pilot operates an overlapping large valve body.

BACKGROUND OF THE INVENTION

Numerous types of proportional pneumatic flow control valves are presently available which accurately control flow over a wide range of flow control applications. These single valves are typically calibrated to a specific range of flow rates; the accuracy of these valves is dependent upon the total range of capable flow, which is otherwise known as the "Full Scale" of the valve. A problem is that these units generally do not offer precision flow at lower rates, the valve percentage of error for the full scale of the valve may be too great; and, the low flow imprecision can be too problematic to the application.

Heretofore, there is known means to proportionally control the flow rate of a medium with flow control valves that increase accuracy over minimal flow rates and that allow for higher flow rate performance. For example. U.S. Pat. No. 5,462,253 to Asthana et al. discloses a dual slop flow control valve which operates by incorporating an electronically controlled valve actuator. The actuator subsequently controls a valve assembly, this process is accomplished using two mechanical valves in sequence.

Another common approach is to use two independent valves in parallel or in sequence to increase accuracy over particular segments of the full flow range. One valve is typically used for lower flow rates, and then a larger valve subsequently compensates for the higher flow rates. Both valves are independently controlled.

There is a need for a mechanically simplified, low-cost device that can increase the precision of low flow output during the initial flow performance of a device's full-scale flow capability while also allowing for higher volume flow for a remaining portion of the full-scale output.

SUMMARY OF THE INVENTION

It is an object of the present invention to provide a mechanism and method which incorporates valves mounted in parallel for controlling a broad range of pneumatic flow rates. It is envisioned that a small, fast, proportionally acting electropneumatic valve pilot operates a larger mechanical valve to obtain a desired low flow precision control white it also allows for high flow capability.

It is an object to provide a mechanism that is small, lightweight, and insensitive to position or vibration; it can readily mount in a process line to be controlled at its work point.

It is an object that the present mechanism can be remotely or locally operated by a process controller or another electrical device. There is also both internal and external feedback whereby accurate repeated operation of the mechanism is ensured.

The present invention establishes a unique electropneumatic proportional flow control device that allows for improved control. The device configuration incorporates two internal valves in parallel a first electronically controlled, miniature proportional valve manipulated in parallel with a second and larger pilot-operated valve. The miniature valve allows for precision control of the low-end of the full scale output; the larger mechanical valve allows for the high-end of the full scale output. These valves are encompassed within a valve assembly comprising a valve manifold, a pilot-operated diaphragm, electronic control circuitry, and a flow restrictor. The device can obtain a flow output turndown ratio of 100,000:1.

BRIEF DESCRIPTION OF THE DRAWINGS

Advantages and features of the present invention are better understood with reference to the following and more detailed description and claims taken in conjunction with accompanying drawings, in which like elements are identified with like symbols:

FIG. 1 is a fragmentary, side-elevational view of an electropneumatic valve according to the present invention, wherein electronic circuitry is shown in block-form.

DESCRIPTION OF THE PREFERRED EMBODIMENTS

The best mode for carrying out the invention is presented in terms of its preferred embodiment, herein depicted with the Figures:

1. Detailed Description of the Figures

To promote an understanding of the principles of the present invention, the embodiment is hereafter explained with reference to respective drawings as well as to specific language to describe the same.

FIG. 1 shows a mechanical construction to which the primary embodiment of the invention is applied. As shown in FIG. 1, an electropneumatic controller 20 is operationally attached to pilot operated valve 22. Pilot operated valve 22 operates in response to an incoming pneumatic pressure at pressure inlet port 1, as well as to electronic signals received by electronic control circuitry 40, to regulate a corresponding volumetric chamber pressure contained by lower pressure chamber 12, which in turn outputs pneumatically controlled flow output via outlet port 13. Thus, pilot operated valve 22 acts as a pressure volume limiter, booster, and sustainer.

Electropneumatic controller 20 includes encasement 35, electronic control circuitry 40, and valve apparatus 21. At a first distal end, encasement 35 configures with manual control opening 38, electrical control opening 37 and at least two screw thread openings 39a-b. An interface cable 42 extends from encasement 35 through the control opening 37. The interface cable 42 carries electrical lines for "ground", "supply", "command" and "analog feedback". These lines are carried by interface cable 42 back to electronic control circuitry 40. At the opposing distal end, the encasement 35 operationally attaches to valve apparatus 21.

Electronic control circuitry 40 includes pressure transducer 45, manual controller 41, and driver circuitry board 43. Electronic control circuitry 40 is connected to electronic interface (not shown) by "ground", "supply", "command", and "analog feedback" wires through interface cable 42. Electronic control circuitry 40 operates to selectively control the opening and closing of proportional valve 30 through electrical line 44. Electronic control circuitry 40 receives feedback from pressure transducer 45, which is in fluid communication with tubing system 19.

Valve apparatus 21 includes a proportional valve 30, flow restrictor 31, and valve manifold 23. Proportional valve 30 and flow restrictor 31 are operationally attached to valve manifold 23 via manifold ports inlet flow passageway 2d and second manifold port 14d, respectively. Proportional valve 30 is of the two-way variety and includes a flexible armature 4, magnetic core 32, inlet flow passageway 2d, and outlet flow passageway 5. In the closed position, flexible armature 4 seats against upper opening of inlet flow passageway 2d. Flow restrictor 31 is of the two-way variety and includes restricted orifice 16, inlet flow passageway 17, and outlet flow passageway 15. Second passageway 2e connects with first manifold port 2c, which is in fluid communication with inlet flow passageway 2d. Outlet flow passageway 5 opens to third passageway 6, which is in fluid communication with upper pressure chamber 11. Upper pressure chamber 11 is in fluid communication with flow passageway 18. Fifth passageway 14c connects with second manifold port 14d, which is in fluid communication with outlet flow passageway 15.

In operation, pressure inlet port 1 connects to first passageway 2a whereby electropneumatic controller 20 receives its supply pressure.

The electronic control circuitry 40 for the electropneumatic controller 20 is described below. Electronic control circuitry 40 includes a closed-loop control system for controlling the pressure output of by having the proportional flow control device deliver flow equal to the flow existing port 13 by actuation of proportional valve 30 in response to an input voltage and the current output pressure value as sensed by a pressure transducer 45.

The closed-loop control system electronic control circuitry 40 actuates proportional valve 30 to provide a regulated pressure output, which is set by the input voltage. Each time the input voltage is set to a new level for selection of a new regulated pressure output the present invention adjusts accordingly. An increase in the input voltage corresponds to a desired increase in pressure output and causes an instantaneous increase of the power supply current supplied to proportional valve 30 via electrical line 44. This increase results in greater pressure output, which is sensed by pressure transducer 45 and converted to a voltage representation of the current output pressure value, which is compared to the current input voltage. This process continues until the voltage representation of the current output flow value is equal to the current input voltage, at which time the power supply current supplied to proportional valve 30 ceases to increase and remain static.

2. Operation of the Preferred Embodiment

The operation of electropneumatic controller 20 in relation to the control of pilot operated valve 22 is now described. The electronic control circuitry 40 receives a voltage or current command through the "command line" corresponding to a proportionate commanded pressure output. Electronic control circuitry 40 also receives pneumatic feedback from pneumatic pressure transducer 45 using tubing 19. In the static state, this pressure feedback is maintained by the cumulative pneumatic flow rates within lower pressure chamber 12, outlet flow passageway 15 connected to forth and fifth passageways 14b, 14c, and second manifold pen 14d to flow outlet port 13, which is in fluid communication with tubing 19.

In response to the comparison between the input voltage from the "command line" and actual output pressure value as sensed by a pressure transducer 45, electronic control circuitry 40 commands the proportional movement of armature 4 as defined by proportional valve 30.

If the input voltage is greater than the actual output pressure value as sensed by a pressure transducer 45, then proportional valve 30 is commanded to move flexible armature 4 upward, away from the upper opening of inlet flow passageway 2d, whereby supplied pressure from pressure inlet port 1 to passageways/port 2a, 2b, 2c, 2e increase through outlet flow passageway 5 and third passageway 6, upper pressure chamber 11, and inlet flow passageway 17, this increase in pressure subsequently increases the flow rate through flow restrictor 31. With an increase in flow through said restrictor 31, there is a resultant increase in backpressure, thereby increasing cumulative pressure within upper pressure 11. This increase in pressure within upper pressure chamber 11 subsequently increases downward force exerted on pressure chamber diaphragm 60: if the downward force is greater than that of the preset spring preload of diaphragm counter-spring 91, and the force operated by the pressure in chamber 12 exerts on pressure chamber diaphragm 60 then the diaphragm is pushed downward along with the vertical position of pilot operated valve 90: which in turn enlarges the opening of pilot operated valve 90, thereby increasing flow and pressure through lower pressure chamber 12, cumulating with the second flow exiting flow passageway 14a for output flow to the system via flow outlet port 13.

Conversely, if the input voltage is less than the actual output pressure value as sensed by a pressure transducer 45, then proportional valve 30 is commanded to move armature 4 downward toward the upper opening of inlet flow passageway 2d, whereby supplied pressure from pressure inlet port 1 to passageways/port 2a, 2b, 2c, 2e decrease through passageways 5, 6, upper pressure chamber 11, and inlet flow passageway 17. This decrease in pressure subsequently decreases the flow restrictor 31. With a decrease in flow through the restrictor 31, there is a resultant decrease in backpressure, thereby decreasing cumulative pressure within upper pressure 11. This decrease in pressure within upper pressure chamber 11 subsequently decreases downward force exerted on pressure chamber diaphragm 60. If the downward force is less than that of the preset spring preload of diaphragm counter-spring 91 and the force created by the pressure in chamber 12 exerted on pressure chamber diaphragm 30, then the diaphragm is released upward along with the vertical position of pilot operated valve 90, thereby decreasing flow and pressure through lower pressure chamber 12, cumulating with the second flow exiting flow passageway 14a for output flow to the system via flow output port 13.

Thus it is seen that proportional valve 30 is characterized by two static states: a fully closed state in which the valve receives no voltage; and, an open state in which the valve receives a voltage of some degree. Additionally, it is intended that pilot operated valve 90 is characterized by two static states: a fully dosed state in which the heretofore-described resultant backpressure of the flow rate through the flow restrictor 31 is less than the present spring force of counter-spring 91 and the force created by the pressure in chamber 12 exerted on pressure chamber diaphragm 60: and, an open state in which the resultant backpressure of the flow rate through flow restricted 31 is greater than the preset spring preload of counter-spring 91 and therefore permits additional flow and pressure to some degree. The interrelationship between opened and closed states of both proportional valve 30 and pilot operated valve 90, as described above, allows for a precise and accurate control of the cumulative flow at flow outlet port 13.

The foregoing descriptions of specific embodiments of the present invention are presented for purposes of illustration and description only. They are not intended to be exhaustive or to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and the embodiments with various modifications as are suited to the particular use contemplated. It is intended that a scope of the invention be defined by the Claims appended hereto and to their equivalents. Therefore, the scope of the invention is to be limited only by the following claims.

What is claimed is:

1. A pilot operated valve assembly comprising:
    an inlet port configured to receive a pneumatic fluid flow,
    an outlet port,
    a proportional valve assembly that includes a first valve having an open and a closed state,
    a second valve assembly that includes a second valve, an upper pressure chamber and a lower pressure chamber, wherein the second valve has an open state and a closed state, wherein when the upper pressure chamber reaches a predetermined pressure level, the second valve switches from the closed state to the open state, thereby allowing pneumatic fluid to flow from the inlet port, past the second valve assembly, to the lower pressure chamber and to the outlet port, and
    a flow restrictor,
    wherein a first pneumatic fluid flow path is defined from the inlet port through the first valve and to the upper pressure chamber,
    wherein a second pneumatic fluid flow path is defined from the upper pressure chamber, through the flow restrictor and to the outlet port,
    wherein a third pneumatic fluid flow path is defined from the inlet port, through the second valve assembly, to the lower pressure chamber and to the outlet port,
    wherein when the pressure in the upper pressure chamber is below the predetermined pressure level pneumatic fluid flows along the second fluid flow path, and wherein when the pressure in the upper pressure chamber is at or above the predetermined pressure level pneumatic fluid flows along the second fluid flow path and the third fluid flow path.

2. The pilot operated valve assembly of claim 1, further comprising an electropneumatic controller that includes electric control circuitry that comprises:
    at least one of a flow transducer or a pressure transducer;
    a manual controller; and,
    driver circuitry;
    wherein said electronic control circuitry operates to selectively control opening and closing of first valve through an electrical line.

3. The pilot operated valve assembly of claim 2, wherein said electronic control circuitry receives feedback from the pressure transducer, which is in fluid communication with the outlet port via a tubing system.

4. The pilot operated valve assembly of claim 2, wherein said electronic control circuitry for said electropneumatic controller comprises:
    a closed-loop control system for controlling a proportional flow output of a proportional flow control device through actuation of the first valve in response to an input voltage and a current output flow value as sensed by the flow transducer.

5. The pilot operated valve assembly of claim 4, wherein said closed-loop control system electronic control circuitry actuates said first valve to provide a regulated proportional flow output, which is set by an input voltage, wherein said proportional valve assembly adjusts each time said input voltage is set to a new level for selection of a new regulated proportional flow output.

6. The pilot operated valve assembly of claim 5 wherein said adjustment comprises:
    an increase in said input voltage corresponding to a desired increase in proportional flow output causes an increase of power supply current supplied to said proportional valve assembly via the electrical line.

7. The pilot operated valve assembly of claim 6, wherein said increase results in greater proportional flow output, which is sensed by the flow transducer and converted to a voltage representation of the current output flow value, which is compared to the current input voltage.

8. The pilot operated valve assembly of claim 7, wherein said increase process continues until a voltage representation of said current output flow value is equal to said current input voltage, at which time said power supply current supplied to said proportional valve assembly ceases to increase and remains static.

9. The pilot operated valve assembly of claim 8, wherein an operation of said electropneumatic controller in relation to a control of said pilot operated valve assembly comprises:
    electronic control circuitry that receives a voltage or current command through a command line corresponding to a proportionate commanded proportional flow output, said electronic control circuitry also receives pneumatic feedback from the pressure transducer via tubing.

10. The pilot operated valve assembly of claim 9, wherein said feedback represents cumulative pneumatic flow rates within the lower pressure chamber and the second pneumatic fluid flow path.

11. The pilot operated valve assembly of claim 10, wherein said electronic control circuitry commands the proportional movement of said flexible armature as defined by said proportional valve assembly in response to a comparison between said input voltage from said command line and actual output flow value as sensed by said flow transducer.

12. The pilot operated valve assembly of claim 11, wherein said proportional valve assembly is commanded to move said flexible armature upward if said flow transducer senses said input voltage is greater than said output flow valve, said flexible armature moves from said upper opening of said inlet flow passageway, whereby supplied pressure from said inlet port to said passageways increase through said outlet flow passageway, upper pressure chamber, and said inlet flow passageway.

13. The pilot operated valve assembly of claim 1, wherein said proportional valve assembly and said flow restrictor are operationally attached to a valve manifold via a manifold ports inlet flow passageway and a second manifold port, respectively, wherein the manifold ports inlet flow passageway partially defines the first pneumatic fluid flow path, and wherein the second manifold port partially defines the second pneumatic fluid flow path.

14. The pilot operated valve assembly of claim 1, wherein said proportional valve assembly includes a flexible armature, a magnetic core, an inlet flow passageway, and an outlet flow passageway, wherein said flexible armature seats against an upper opening of the inlet flow passageway when the first valve is in the closed state, and wherein said inlet flow passageway and said outlet flow passageway define a portion of the first pneumatic fluid flow path.

15. The pilot operated valve assembly of claim 1, wherein said flow restrictor includes a restricted orifice positioned along the second pneumatic fluid flow path between an inlet flow passageway and an outlet flow passageway.

16. The pilot operated valve assembly of claim 1, wherein an increase in pressure in said upper pressure chamber subsequently increases a flow rate through said flow restrictor, said increase in said flow rate through said flow restrictor results in an increase in backpressure, thereby increasing cumulative pressure within the upper pressure chamber.

17. The pilot operated valve assembly of claim 16, wherein said increase in said pressure within said upper pressure chamber subsequently increases downward force exerted on a pressure chamber diaphragm associated with the second slave valve assembly.

18. The pilot operated valve assembly of claim 1, wherein the second valve assembly includes a diaphragm, wherein a downward force that is greater than that of a preset spring preload of a diaphragm counter-spring causes said diaphragm to push downward, which in turn switches the second valve from the closed state to the open state, thereby providing flow from the inlet port, through said second valve assembly, through said lower pressure chamber and to the outlet port.

19. The pilot operated valve assembly of claim 1 wherein when the pressure level of the upper pressure chamber is below the predetermined pressure level, the first pneumatic fluid flow path and the second pneumatic fluid flow path combine to define a low pressure pneumatic fluid flow path, wherein when the pressure level of the upper pressure chamber is at or above the predetermined pressure level, the first pneumatic fluid flow path and the second pneumatic fluid flow path combine to define a first high pressure pneumatic fluid flow path and the third pneumatic fluid flow path defines a second high pressure pneumatic fluid flow path.

20. The pilot operated valve assembly of claim 19 wherein the flow restrictor includes a restricted orifice therein, and wherein the restricted orifice partially defines the second pneumatic fluid flow path.

* * * * *